(12) United States Patent
Simon

(10) Patent No.: US 6,860,419 B2
(45) Date of Patent: Mar. 1, 2005

(54) APPARATUS AND METHOD FOR CONTROLLING MOVEMENT OF A DEVICE AFTER PACKAGING

(75) Inventor: Jonathan Simon, Castro Valley, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 10/232,483

(22) Filed: Aug. 30, 2002

(65) Prior Publication Data

US 2004/0041010 A1 Mar. 4, 2004

(51) Int. Cl.[7] .................... B23K 31/02; B23K 1/018; B23K 28/00
(52) U.S. Cl. .................... 228/234.3; 228/264
(58) Field of Search ................ 228/234.3, 107, 228/246, 2.5, 4.1, 9, 12, 47.1, 264, 112.1, 2.1, 113, 114, 114.5; 428/420

(56) References Cited

U.S. PATENT DOCUMENTS

| | | | | |
|---|---|---|---|---|
| 3,745,641 A | * | 7/1973 | Paolini | 228/114.5 |
| 3,965,567 A | * | 6/1976 | Beerwerth et al. | 438/13 |
| 4,819,560 A | * | 4/1989 | Patz et al. | 102/202.5 |
| 5,061,914 A | * | 10/1991 | Busch et al. | 337/140 |
| 5,154,340 A | * | 10/1992 | Peacock | 228/114.5 |
| 5,538,795 A | * | 7/1996 | Barbee et al. | 428/420 |
| 6,142,360 A | * | 11/2000 | Hutt | 228/114.5 |
| 6,203,869 B1 | | 3/2001 | Dougherty et al. | |
| 6,334,571 B1 | * | 1/2002 | Shantz et al. | 228/256 |
| 2001/0038029 A1 | * | 11/2001 | Weihs et al. | 228/117 |
| 2001/0046597 A1 | * | 11/2001 | Weihs et al. | 428/336 |
| 2002/0047037 A1 | * | 4/2002 | Shinoda et al. | 228/112.1 |
| 2003/0102354 A1 | * | 6/2003 | Okamura et al. | 228/112.1 |

FOREIGN PATENT DOCUMENTS

JP 08-236924 A * 9/1996
RU 2037721 C1 * 6/1995

OTHER PUBLICATIONS

Weihs, et al.; U.S. Appl. No. US 2001/0046597 A1: "Reactive Multilayer Structures for Ease of Processing and Enhanced Ductility"; Publication date Nov. 29, 2001.

Weihs et al.; U.S. Appl. No. US 2001/0038029 A1: "Method of Making Reactive Multilayer Foil and Resulting Product"; Publication date Nov. 8, 2001.

* cited by examiner

Primary Examiner—Lynne R. Edmondson

(57) ABSTRACT

An apparatus and method for controlling movement of packaged devices. Specifically, embodiments of the present invention discloses an apparatus a method of providing a controlling mechanism for effecting physical control over a device that is disposed on a structure. An exothermically reactive structure is disposed on the controlling mechanism, such that, when activated, an exothermic alloying reaction between alloys in the exothermically reactive structure operates the controlling mechanism. The controlling mechanism is adapted to release the device, position the device, or tune the device.

19 Claims, 10 Drawing Sheets

APPARATUS AND METHOD FOR CONTROLLING MOVEMENT OF A DEVICE AFTER PACKAGING

TECHNICAL FIELD

The presently claimed invention relates to the field of packaging electronic devices. More specifically, the presently claimed invention relates to the controlling of movement of a device after the device has been packaged.

BACKGROUND ART

Packaging of electronic devices in sealed or hermetic enclosures may be necessary to ensure proper operation of the device within a contaminant free environment. However, during device manufacturing and packaging, physical control over a device may be necessary to prevent the device from damage, or to fix a position of the device.

Proper control over the device during fabrication and packaging of device may include the securing and releasing of devices to a structure. For example, a device may be secured to a structure during device manufacturing and packaging to protect the device from physical damage due to stiction. Stiction occurs when surface adhesion forces of small scale devices are more powerful than mechanical restoring forces of the structure. In this case, the device is pulled towards the substrate resulting in failure of the device. With proper control of the device, after packaging, the device is released from the structure for proper operation.

In addition, control over the positioning and orientation of a device within a structure may be required. Also, tuning the mechanical response of a device, such as a resonating device, requires physical control over various locations of the device in order to fix the resonating frequency of the device. Both of these actions may be accomplished through the operation of bimorph actuators. Operation of the actuator can be induced by heating the actuator with current supplied through wire leads. It may be desirable to induce operation of the actuator without the use of current in situations involving sensitive devices, and for reducing the complexity of fabrication, and increasing scalability.

Thus, a need exists for an apparatus and method for releasing a device in a packaged environment. A further need exists for an apparatus which meets the above need and further restricts movement of a device in a packaged environment. Another need exists for an apparatus which meets the above needs and which provides for the tuning of a device in a packaged environment.

DISCLOSURE OF THE INVENTION

An apparatus and method for controlling devices after packaging is disclosed. Embodiments of the present invention disclose a controlling mechanism for effecting physical control over a device. Operation of the controlling mechanism occurs with the activation of an exothermically reactive structure. When activated, the exothermically reactive structure generates heat from an exothermic alloying reaction between alloys in the exothermically reactive structure. Operation of the controlling mechanism includes releasing a device from a structure, securing a device, positioning a device, and tuning a device.

These and other technical features of the present invention will no doubt become obvious to those of ordinary skill in the art after having read the following detailed description of the embodiments which are illustrated in the various drawing figures.

BRIEF DESCRIPTION OF THE DRAWINGS

The accompanying drawings, which are incorporated in and form a part of this specification, illustrate embodiments of the invention, and together with the description, serve to explain the principles of the invention.

DETAILED DESCRIPTION OF THE INVENTION

Reference will now be made in detail to embodiments of the present invention, apparatus and method for controlling movement of devices after packaging using an exothermically reactive structure, examples of which are illustrated in the accompanying drawings. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
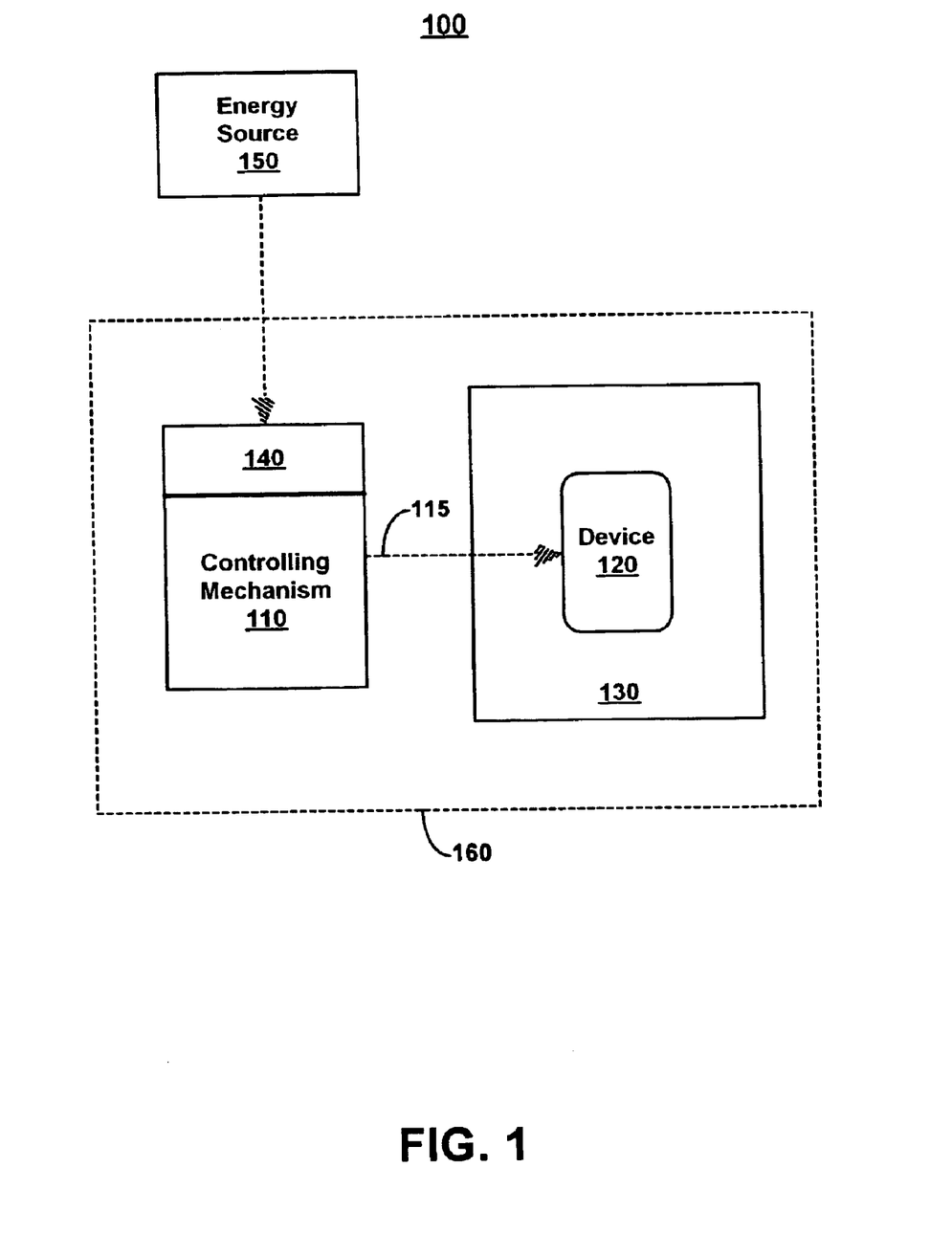
FIG. 1 is a block diagram of an exemplary system capable of controlling movement of devices in a packaged environment, in accordance with one embodiment of the present invention.

FIG. 1 is a block diagram of an exemplary system 100 for controlling movement of devices after packaging, in accordance with one embodiment of the present invention. In the present embodiment, a exemplary controlling mechanism 110 effecting physical control over a device 120 is illustrated. The physical control effected over the device is illustrated by dotted line 115. For purposes of the present Application, the term "effecting physical control" includes securing the device 120, releasing the device 120, positioning the device 120, tuning the device 120, etc.

The device 120 is disposed on a structure 130. The structure 130 in one embodiment is a semiconductor substrate. In another embodiment, the structure 130 includes a packaged enclosure 160, wherein the device 120 is disposed on a substrate 130 within the packaged enclosure 160.

An exothermically reactive structure 140 is coupled to the controlling mechanism. In one embodiment, the exothermically reactive structure 140 is attached to or disposed on a localized segment of the controlling mechanism. When activated by an external energy source 150, the exothermically reactive structure 140 generates heat from an exothermic alloying reaction between alloys in the exothermically reactive structure 140. The heat from the exothermic alloying reaction induces operation of the controlling mechanism 110. In one embodiment, the external energy source 150 is outside the packaged enclosure 160.

Figure 6:
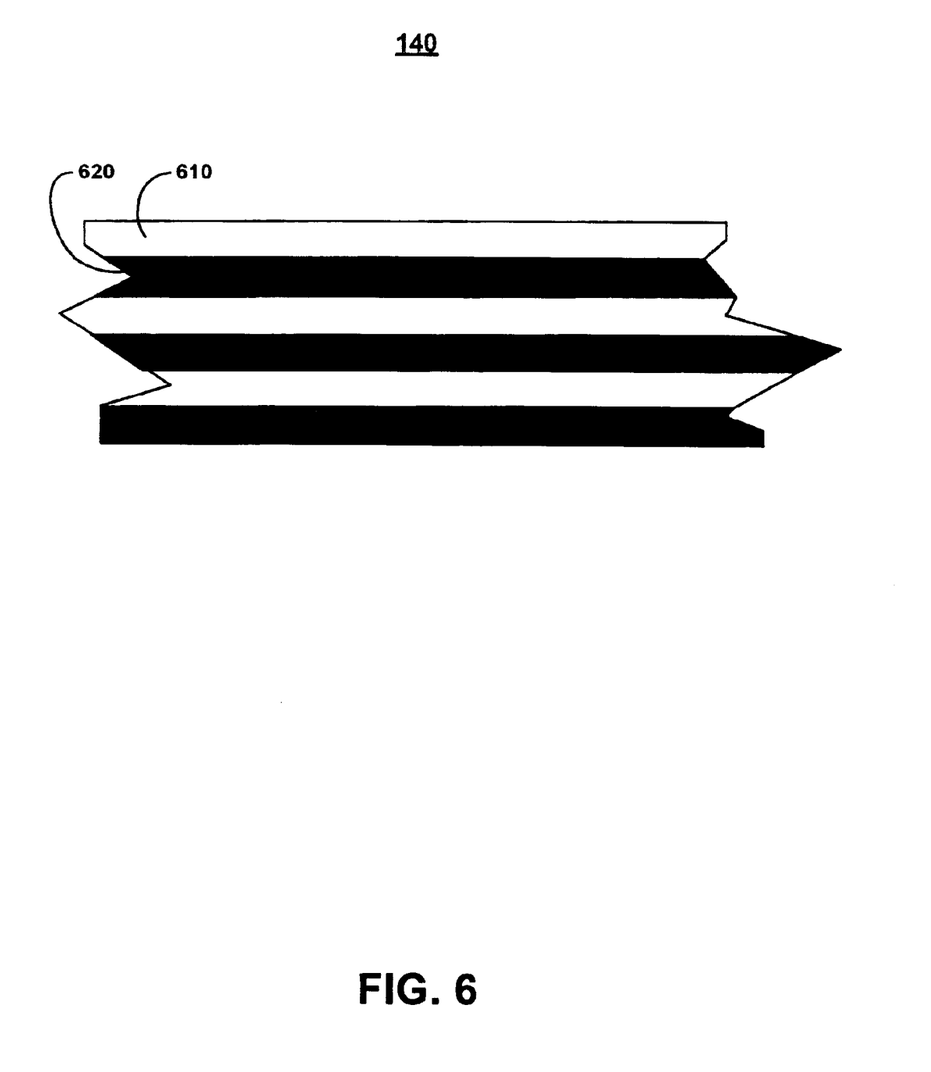
FIG. 6 is a diagram illustrating a cross section of an exothermically reactive structure, in accordance with one embodiment of the present invention.

FIG. 6 is a diagram illustrating a cross section of a exothermically reactive structure 140 of FIG. 1 used for effecting physical control over a device, in one embodiment of the present invention. The exothermically reactive structure 140 is in the form of a strip, pad, or any suitable shape and size to ensure the initiation and propagation of an exothermic reaction throughout the exothermically reactive structure 140. For purposes of the present invention, the term effecting physical control over a device refers to securing a device, releasing the device, positioning the device, tuning the device, etc.

The exothermically reactive structure 140 includes exothermically reactive materials, well known in the art. In one embodiment, the exothermically reactive structure 140 contains thin films of alternating layers of metals. The thin films or layers of metals are of submicron thickness and are deposited onto the preceding metal layer. For example, FIG. 6 illustrates a first layer 610 alternating with a second layer 620 to form the exothermically reactive structure 140. In one embodiment, the thin films or layers form a thin foil structure comprising a multiple of reactive elemental metal layers.

The exothermically reactive structure 140, when activated, produces localized heating. The exothermically reactive structure is comprised of certain metals. These metals, when placed in contact, and initiated with energy, e.g., a threshold amount of heat, is capable of alloying reactions that are highly exothermic. As will be discussed below, the exothermically reactive structure 140 is used for effecting physical control over a device, such as, the releasing, restricting of movement, and tuning of various electromechanical devices.

An energy source (not shown) is made available, in one embodiment, in order to initiate the exothermic reaction produced from the metals of the exothermically reactive structure 140. To list a few, as will be discussed further, the energy source includes a laser for providing localized heating, a current source for providing localized heating, or an oven for providing bulk, or global heating of the hermetic enclosure.

The metals contained within the first layer 610 and the second layer 620 contain metals that when placed in contact, and initiated with an amount of heat, or other forms of energy, exceeding a certain threshold, is capable of an alloying reaction that is highly exothermic. In one instance, nickel is the metal placed in the first layer 610, and aluminum is the metal placed within the second layer 620. Other well known and varying combinations of metals are also deposited to form the exothermically reactive structure 140.

In one embodiment, the exothermically reactive structure 140 is a multilayer structure that varies in the number and type of layers. For example, two or more layers of metal are combined to create the exothermically reactive structure 140. In addition, two or more types of metal layers are used to form the exothermically reactive structure 140. Varying combinations of the layers of metals are implemented to form the exothermically reactive structure 140. By way of illustration, FIG. 6 illustrates an alternating layer construction whereby the multilayer structure 140 is formed by alternating two or more metal layers (e.g., metal layer 610 and metal layer 620).

The exothermically reactive structure 140, in conjunction with accompanying devices, is capable of controlling the position and movement of a device, and are implemented upon a semiconductor substrate or within a sealed enclosure, in embodiments of the present invention. The enclosure, also referred to as a package is suitably sized to contain, for example, microelectronic components. Also, the microelectronic components are integrated into the semiconductor substrate, in one embodiment. While embodiments of the present invention are described within the context of microelectronic packaging, other embodiments are well suited to substrates and packages supporting or containing small scale, as well as, large scale devices.

One embodiment of the present invention discloses a tether as the controlling mechanism 110 of FIG. 1. The tether attaches a device to a structure. An exothermically reactive structure is disposed on the tether, such that, when activated, an exothermic alloying reaction melts the tether, thereby releasing the device. An energy source providing a sufficient amount of heat is used to initiate the exothermic alloying reaction.

Figure 2A:
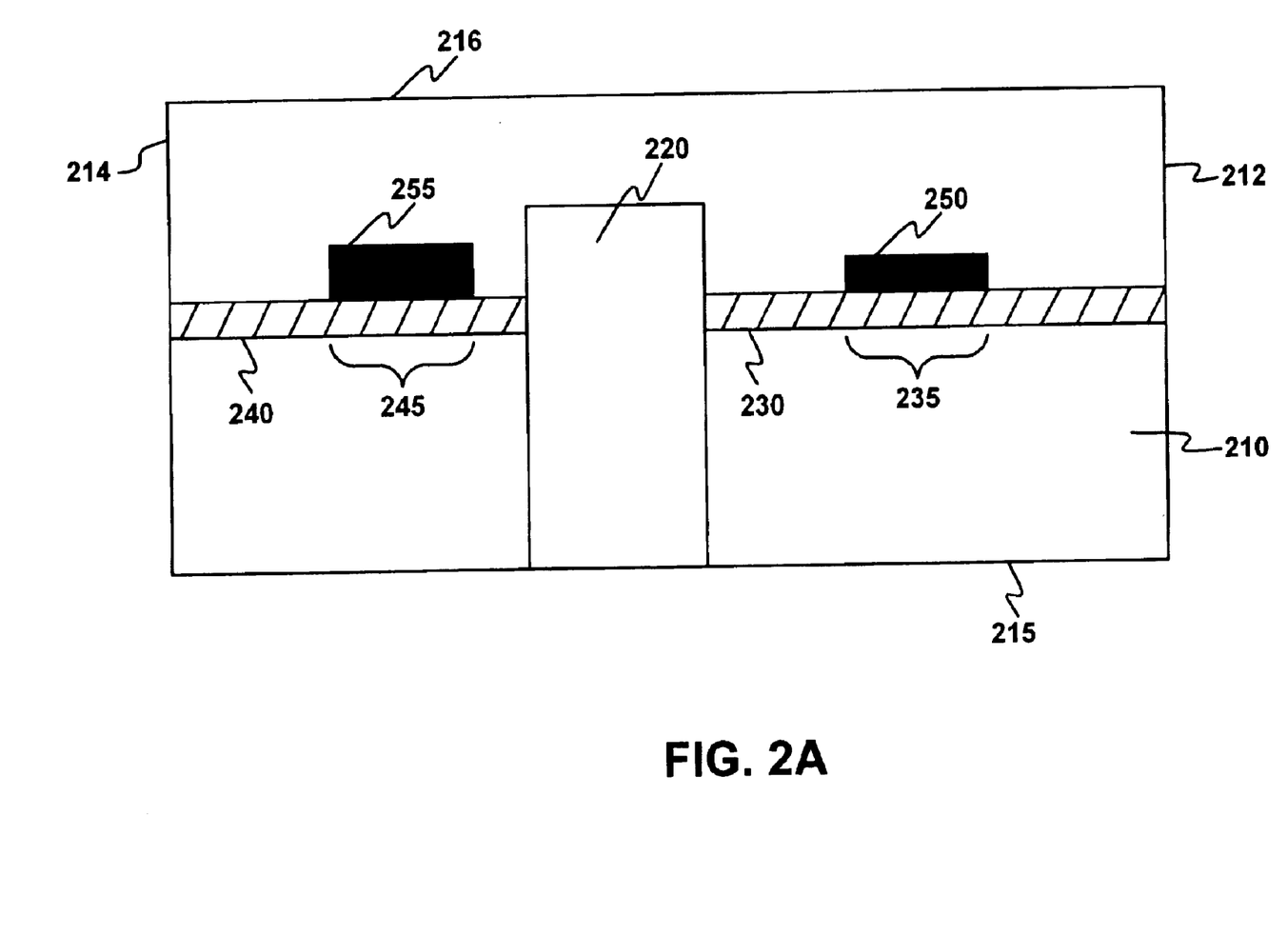
FIG. 2A is a cross section of a sealed enclosure containing exothermically reactive structures disposed on tether wires before releasing a device contained within the sealed enclosure, in accordance with one embodiment of the present invention.

FIG. 2A is a diagram illustrating a cross section of a sealed enclosure 210 containing a tethered device 220, in the present embodiment. The sealed enclosure 210 comprises a sidewall 212 and 214 formed on a substrate 215. In one embodiment, the sealed enclosure 210 is a hermetically sealed enclosure.

In one embodiment, the sealed enclosure 210 is suitably sized to contain varying sizes of devices 220. In one embodiment, the device 220 is a small scale device. In another embodiment, the device 220 is a large scale device. In still another embodiment, the device 220 is a microelectronic device.

A tether wire 230 is attached to the device 220 and the sidewall 212 for supporting the device 220 in a fixed position. A tether wire 240 is shown attached to the device 220 and the sidewall 214 for supporting the device 220 in the fixed position. Other tether wires not shown may be implemented to maintain the device 220 in the fixed position. The tether wire is comprised of any suitable material for supporting the device 220. In one embodiment, the tether comprises a metal, such as, aluminum, which is suitably sized to support the varying sizes of the device 220 (e.g., large scale devices down to microelectronic devices).

FIG. 2A is illustrates the securing of a device to a structure in an exemplary manner only. The locations of the tether wires depend on the size and shape of the device that needs securing. The locations of the tether wires also depend on the structure upon which the device is secured.

The tether wires 230 and 240 are implemented to avoid damage to the device 220 during fabrication and packaging. In one instance, the tether wires 230 and 240 help eliminate the problem of stiction, such that the device 220 is attracted to the sidewalls (e.g., 212 and 214) or substrate 215 of the sealed enclosure 210.

While the present embodiment illustrates the device 220 tethered to the walls, and fixed to the substrate 215 of the sealed enclosure 210, other embodiments are well suited to tethering the device 220 directly to the substrate, or to the ceiling 216 of the enclosure 210. In still another embodiment, the device 220 is tethered to the various walls, ceilings, and substrates of the enclosure 210 such that the device 220 is not supported by any structure of the sealed enclosure 210, but left floating.

An exothermically reactive structure 250 is disposed on a localized segment 235 of the tether wire 230. Similarly, an exothermically reactive structure 255 is disposed on a localized segment 245 of the tether wire 240. Each of the exothermically reactive structures 250 and 255, in one embodiment, is the multilayer structure 140 as described in FIG. 6. As such, in one embodiment, the exothermically reactive structure (250 and 255) comprises a multilayer structure comprising at least two thin foil layers of at least two different alloying metals that when heated results in the exothermic alloying reaction.

When activated by an energy source (not shown), the exothermically reactive structures 250 and 255 produce localized heating for melting the tether wires 230 and 240 in the localized segments 235 and 245, respectively. The exothermically reactive structures 250 and 255 are capable of alloying reactions that are highly exothermic, when placed in contact, and initiated with sufficient amounts of energy, e.g., a threshold amount of heat. In one embodiment, the exothermically reactive structures 250 and 255 are activated after fabrication and packaging.

Figure 2B:
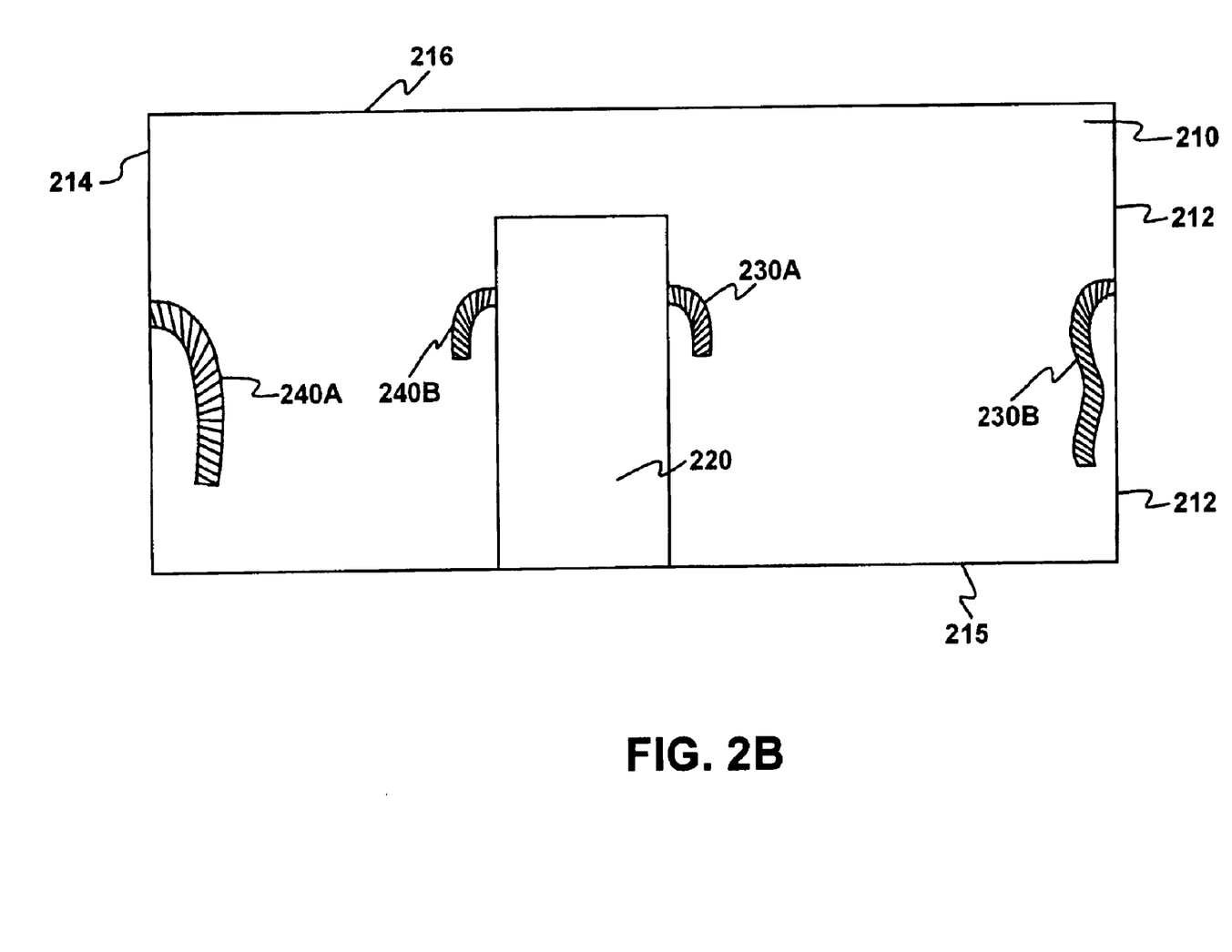
FIG. 2B is a cross section of the sealed enclosure of FIG. 2A after releasing a device contained within the sealed enclosure, in accordance with one embodiment of the present invention.

FIG. 2B is a diagram illustrating a cross section of the sealed enclosure 210 containing a tethered device 220 that has been released, in one embodiment of the present invention. In the present embodiment, the exothermically reactive structures 250 and 255 have been activated by an energy source (not shown). The energy source in one embodiment is a laser for providing localized heating, an oven for providing bulk, or global heating of the sealed enclosure 210.

After activation of the exothermic reactions between the metal layers in the exothermically reactive structures 250 and 255, a sufficient amount of heat is generated to melt the localized sections 235 and 245 of the tether wires 230 and 245, respectively. As such, the tether wire 230 is now broken into two sections: section 230A that is attached to the device 220, and section 230B that is attached to the sidewall 212. Moreover, the tether wire 240 is now broken into two sections: section 240A that is attached to the sidewall 214, and section 240B that is attached to the device 220. The tether wires 230 and 240 have released the device 220 from the sidewalls 212 and 214 of the sealed enclosure 210.

In another embodiment, the tether wire 230 is comprised of the exothermically reactive structure 250. In this way, the exothermically reactive structure 250 provides both the function of tethering the device 220, and of releasing the device 220 when the exothermically reactive structure 250 is activated.

Figure 3A:
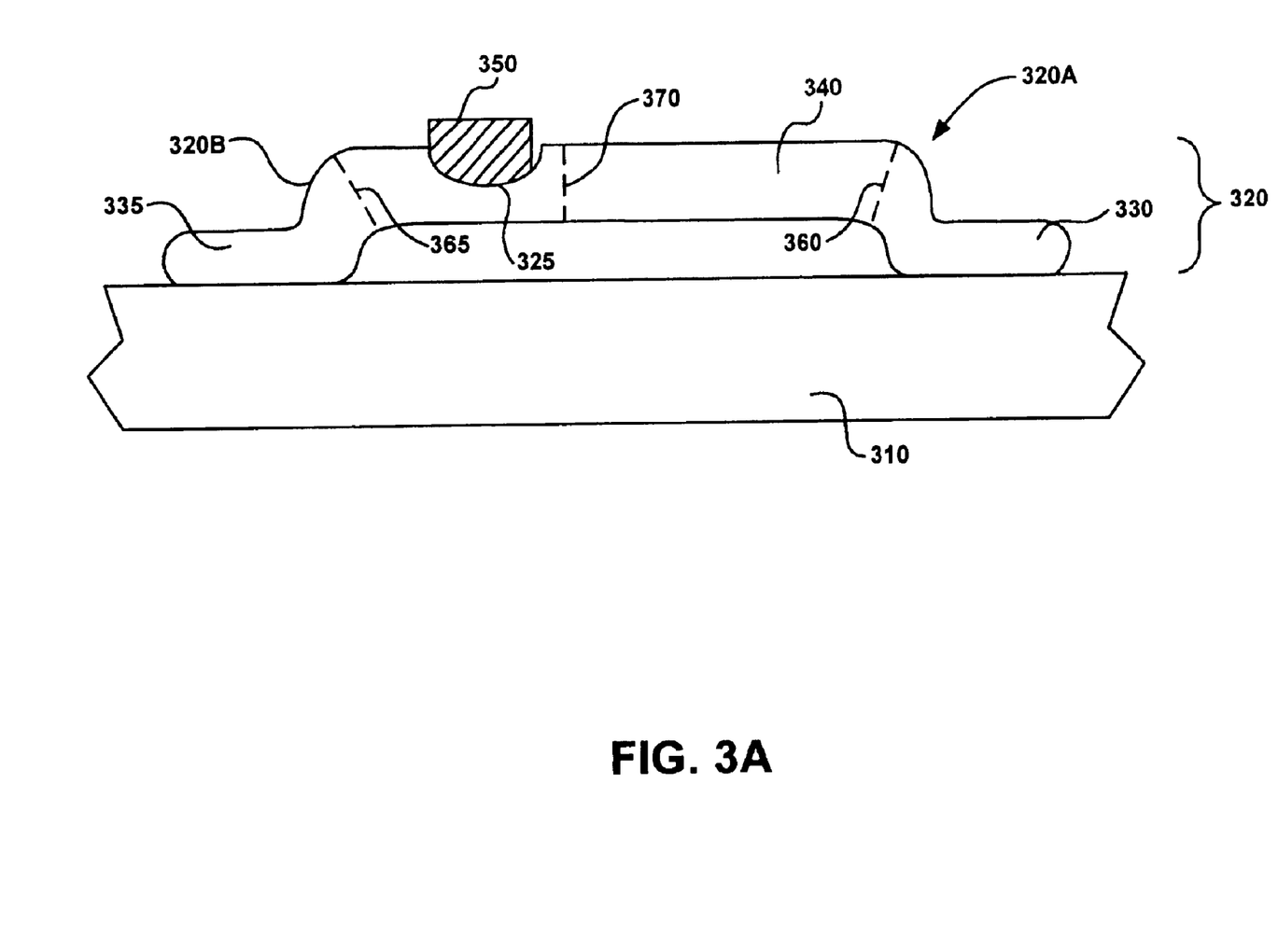
FIG. 3A is a cross section of a cantilevered structure anchored at two ends to a substrate and having an exothermically reactive structure disposed on a surface of the cantilevered structure for purposes of disengaging one end of the cantilevered structure from the substrate, in accordance with one embodiment of the present invention.
Figure 3B:
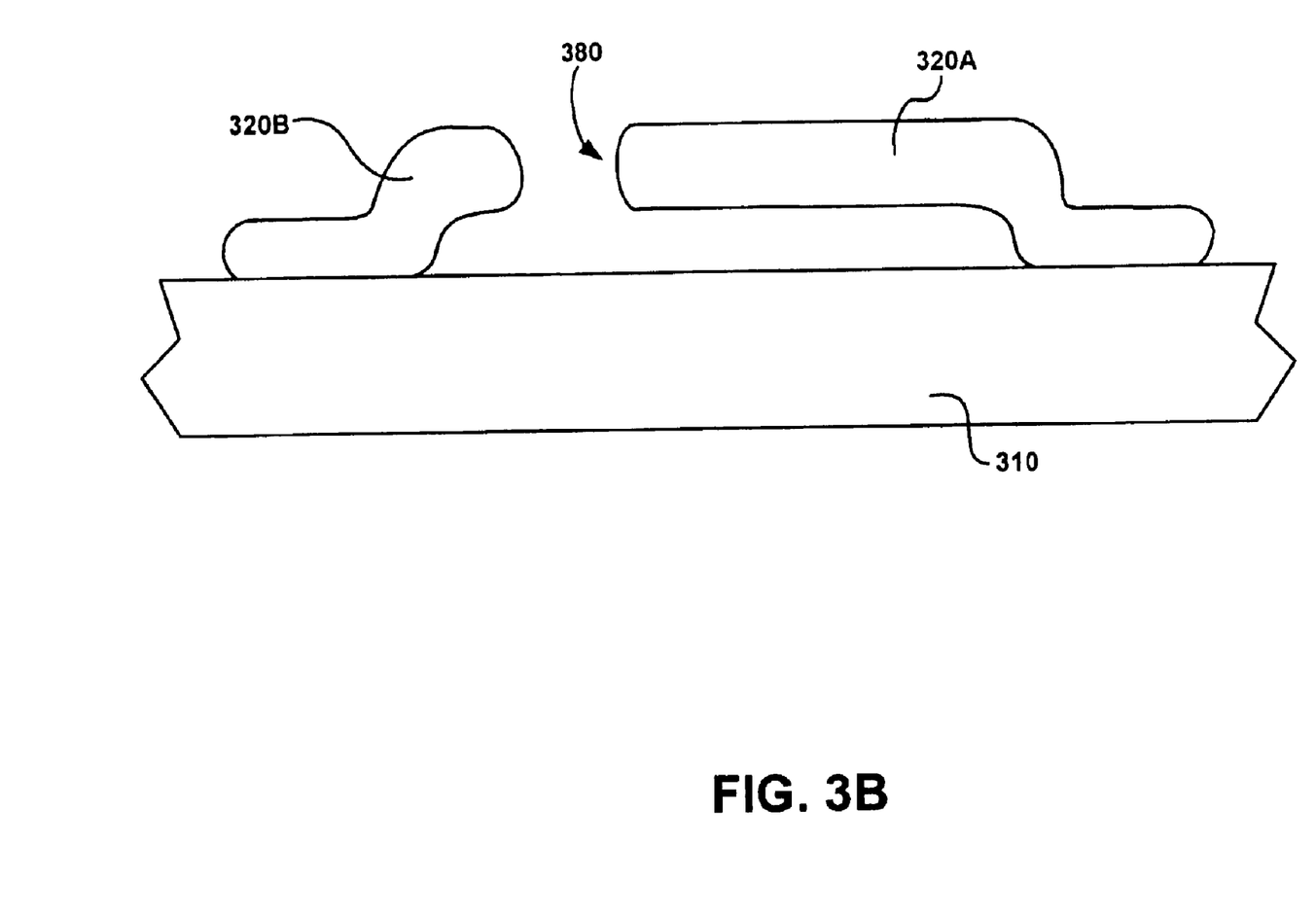
FIG. 3B is a cross section of a cantilevered structure that is anchored to a substrate only at one end after the exothermically reactive structure of FIG. 3A has been activated, in accordance with one embodiment of the present invention.

FIGS. 3A and 3B are diagrams illustrating cross sections of a structure 320 disposed on a substrate 310, in one embodiment. While embodiments of the present invention are described in relation to a cantilevered structure, other embodiments are well suited to various devices and structures supported on a substrate or other suitable platform that are released using exothermically reactive structures, e.g., the structures in FIG. 1.

FIG. 3A is a cross section of the structure 320 during manufacturing and packaging of the structure 320. The structure 320 is comprised of two parts 320A and 320B that is separated by dotted line 370. The cantilevered structure is formed from part 320A. The cantilevered structure, as shown in FIG. 3A is a resonator, in one embodiment. Part 320B forms a support structure for cantilevered structure in part 320A during fabrication and packaging. In particular, the support structure in part 320B ensures that the cantilevered structure in 320B is physically apart from the substrate 310.

More particularly, the structure 320 includes a first anchor 330 attached to the substrate 310. The anchor 330 supports the structure 320 on and above the substrate 310. The structure 320 also includes a second anchor 335 that is attached to the substrate 310.

In addition, the structure 320 includes an arm member 340. The arm member 340 includes a first end 360 defined generally by the dotted line 360 that is attached to the first anchor 330. Also, the arm member 340 includes a second end 365 defined generally by the dotted line 365 that is attached to the second anchor 335. The arm member is physically displaced off of the substrate 310.

The structure 320 is formed with an optional dimpled region 325. The dimpled region 325 forms a weakened region in the structure 320 that is more susceptible to melting. The dimpled region is of any suitable size and shape to facilitate the melting or breaking of part 320B in the dimpled region 325. The dimpled region 325 in one embodiment is formed in the arm region 340 nearer to the second anchor 335.

Part 320B including the dimpled region 325 is the controlling mechanism 110 of FIG. 1, in one embodiment. Part 320B initially provides the support for the arm member 340 during fabrication and packaging. However, operation of the controlling mechanism in part 320B and the dimpled region releases the arm member 340 by separating the arm member 340 from part 320B.

An exothermically reactive structure 350 is disposed on top of the dimpled region 325 to facilitate the melting or breaking the support structure of part 320B. When activated by an energy source (not shown), the exothermically reactive structure 350 produces localized heating for melting the dimpled region 325 of the support structure in part 320B. As discussed previously, the energy source in one embodiment is a laser for providing localized heating, a current source for providing localized heating, or an oven for providing bulk, or global heating of the sealed enclosure 210.

The exothermically reactive structure 350 is capable of an alloying reaction that is highly exothermic, when placed in contact, and initiated with sufficient amounts of energy, e.g., a threshold amount of heat. The exothermically reactive structure 350 is similar to the structure 140 as described in FIG. 6.

FIG. 3B is a cross section of the structure 320 after activation of the exothermically reactive structure 350 has melted the dimpled region 325 of the structure 320. In one embodiment, an energy source (not shown) activates the exothermic alloying reaction between the materials comprising the exothermically reactive structure 350 after packaging of the device 320.

The melting of the dimpled region 325 of the arm member 340 results in the partial separation of the cantilevered structure 320A from the support structure of part 320B. The separation results in a free end 380 of the arm member 340 that is capable of movement. Since the activation of the exothermically reactive structure 350 occurs after packaging, the cantilevered structure 320A avoids any stiction problems with the substrate 310. As such, the free end 380 is capable of movement, such as, in the case with a resonator.

In another embodiment, a device is positioned by initiating contact with a thermal actuator. When activated, the actuator bends and engages with a corresponding mated coupler located on the device in order to fix the position or orientation of the device. In the present embodiment, the actuator is the controlling mechanism 110 of FIG. 1.

Figure 4A:
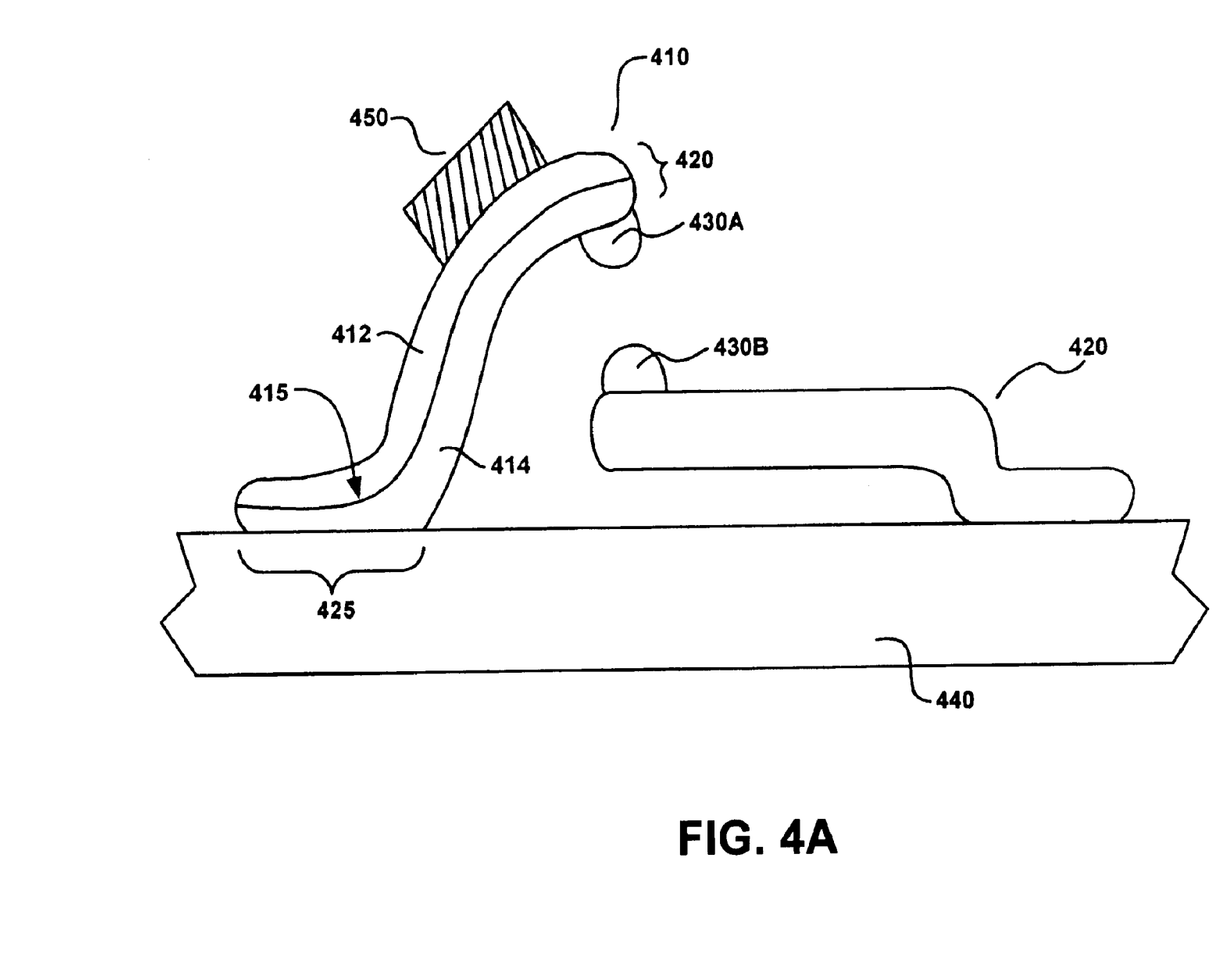
FIG. 4A is a cross section of a thermal bimorph actuator having an exothermically reactive structure disposed on a surface of the actuator for purposes of bending a free end of the actuator, in accordance with one embodiment of the present invention.
Figure 4B:
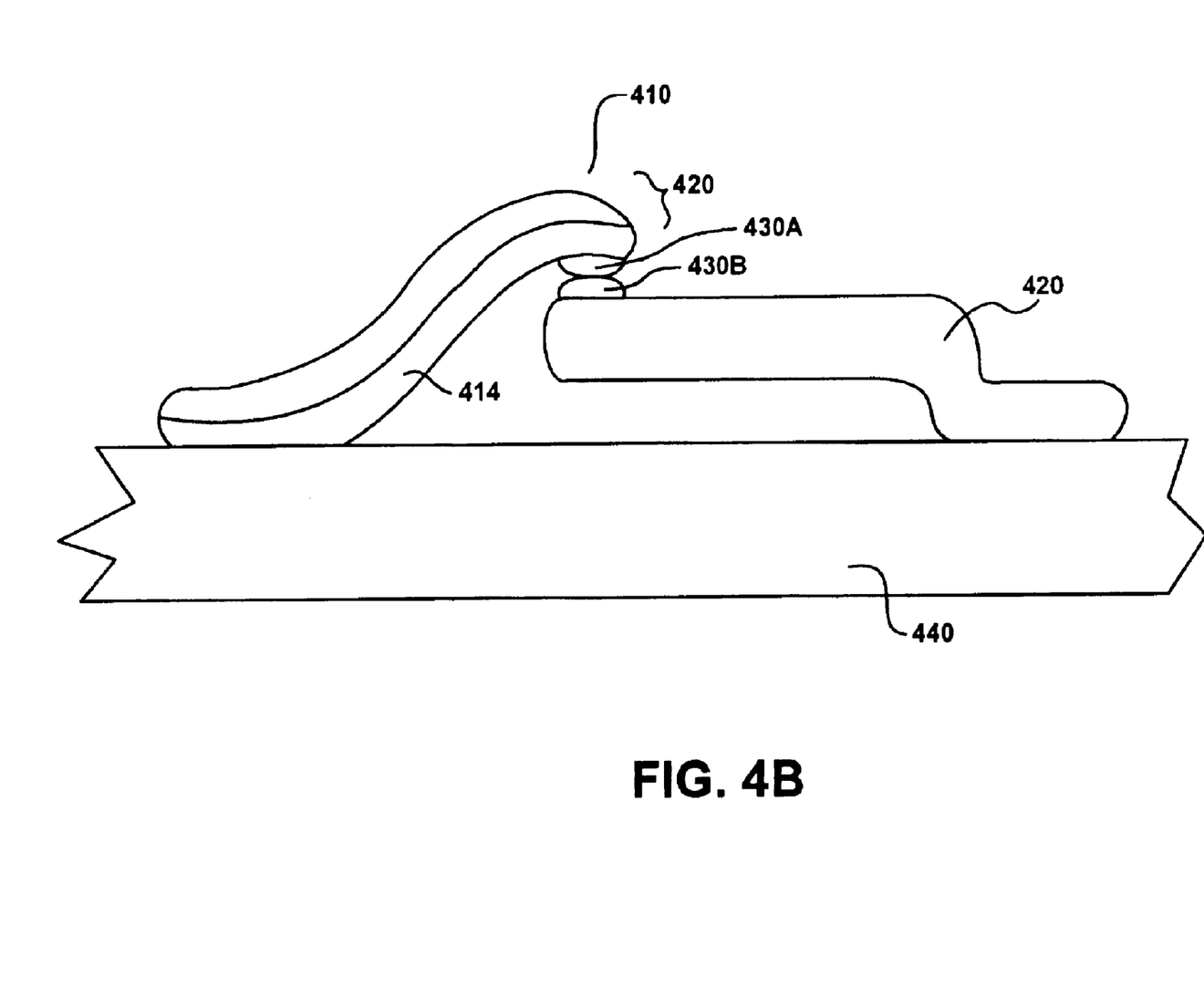
FIG. 4B is a cross section of the thermal bimorph actuator of FIG. 4A after the exothermically reactive structure has been activated, in accordance with one embodiment of the present invention.

In the present embodiment, FIGS. 4A and 4B are diagrams illustrating cross sections of an actuator 410 before and after activation of an exothermically reactive structure 450. While embodiments of the present invention are described in relation to a thermal bimorph actuator, other embodiments are well suited to various devices and structures that are capable of movement when exposed to heat and other forms of energy, e.g., the structures in FIG. 1.

FIG. 4A is a cross section of the thermal bimorph actuator 410 and a cantilevered structure 420. The thermal bimorph actuator 410 comprises a first layer 414 and a second layer 412. The second layer 412 is disposed on an adjoining surface 415 of the first layer 414 that lies between the first layer 414 and the second layer 412. The first layer 412 and the second layer 414, combined as a actuator structure 410, comprises an anchored end 425 and a free end 420. The anchored end 425 of the actuator 410 is attached to the substrate 440. The free end 420 of the actuator 410 is capable of movement.

The first layer 414 has a first thermal expansion coefficient. The second layer 414 has a second thermal expansion coefficient that has a greater positive value than the first thermal expansion coefficient. As such, when exposed to heat, the first layer 414 and the second layer 412 thermally expand. Since the second layer 414 has a greater thermal expansion coefficient, the second layer 414 will expand more fully when compared to the first layer 412. As such, the free end 420 of the actuator 410 will bend towards the first layer 414.

An exothermically reactive structure 450 is disposed on a top surface of the second layer 412. The exothermically reactive structure 450 when activated imparts localized heating for imparting thermal expansion to the first layer 414 and the second layer 412. As discussed previously a bending motion of the free end 420 is effected towards the first layer 414. While the present embodiment illustrates the exothermically reactive structure 450 disposed on top of the second layer 412, other embodiments are well suited to disposing the exothermically reactive structure 450 on a surface of the first layer 414. In one embodiment, the exothermically reactive structure 450 comprises a multilayer structure comprising at least two thin foil layers of at least two different alloying metals that when heated results in the exothermic alloying reaction.

As discussed previously, the energy source in one embodiment is a laser for providing localized heating, a current source for providing localized heating, or an oven for providing bulk, or global heating of a sealed enclosure containing the exothermically reactive structure 450.

Disposed on the free end 420 of the actuator 410 is a coupling component 430. In one embodiment, the free end 420 is adaptively shaped to incorporate the coupling component 430. The coupling component 430 is adaptively shaped to permanently couple to a mated component 430B when in contact. In FIG. 4A, the mated component 430B is attached to the end of the cantilever structure 420 that is capable of movement.

FIG. 4B is a cross section of the actuator 410 after activation of the exothermically reactive structure 450. In one embodiment, an energy source not shown) activates the exothermic alloying reaction between the materials comprising the exothermically reactive structure 450 after packaging of the actuator 410 and the cantilevered structure 420.

Heating of the actuator 410 by the exothermic alloying reaction between metal layers of the exothermically reactive structure 450 bends the actuator 410 in a direction towards the first layer 414, when initiated with sufficient amounts of energy, e.g., a threshold amount of heat. In one embodiment the bending motion of the actuator 410 moves the free end 420 of the actuator 410 into contact with the mated component 430B. The mated component 430B is attached to a device, the cantilever structure 420.

As such, the actuator 410 upon bending will restrict movement of the cantilevered structure 420. When the coupling component 430A is permanently coupled to mated component 430B, movement in the cantilevered structure 420 is permanently restricted.

In this way, in one embodiment, the actuator 410 can be used to tune the mechanical response of the cantilevered structure 420, a resonating device. Additionally, in general, the actuator 410 can tune the mechanical response of any electromechanical device, and, as such, is not limited to tuning the mechanical response of a resonating device.

In another embodiment, arrays of the actuators are arranged around a device for purposes of maneuvering the device into a desired position. Each of the actuators is associated with a mated component that is attached directly to the device or to extensions off of the device. In this manner, the device is positioned by activating certain actuators in the array of actuators. Furthermore, the position of the device is fine tuned by activating other actuators.

In still another embodiment, the actuator 410 is comprised of non-elastic materials. When heated, the bending motion of the actuator is irreversible during cool down of the actuator. As such, the coupling component 430A and the mated component 430B are unnecessary.

In addition, a tunable device is tuned by initiating contact with various thermal actuators, in accordance with one embodiment of the present invention. In varying locations on the tunable device mated couplers are attached. A plurality of fixed actuators are associated with each of the mated couplers. When individually activated, the actuators engage with a corresponding mated coupler in order to tune the tunable device. The locations are chosen, such that, fixing the location restricts the overall movement of the tunable device, thereby allowing for tuning the device by shortening the tunable portion of the tunable device. Each of the actuators is the controlling mechanism 110 of FIG. 1.

Figure 5:
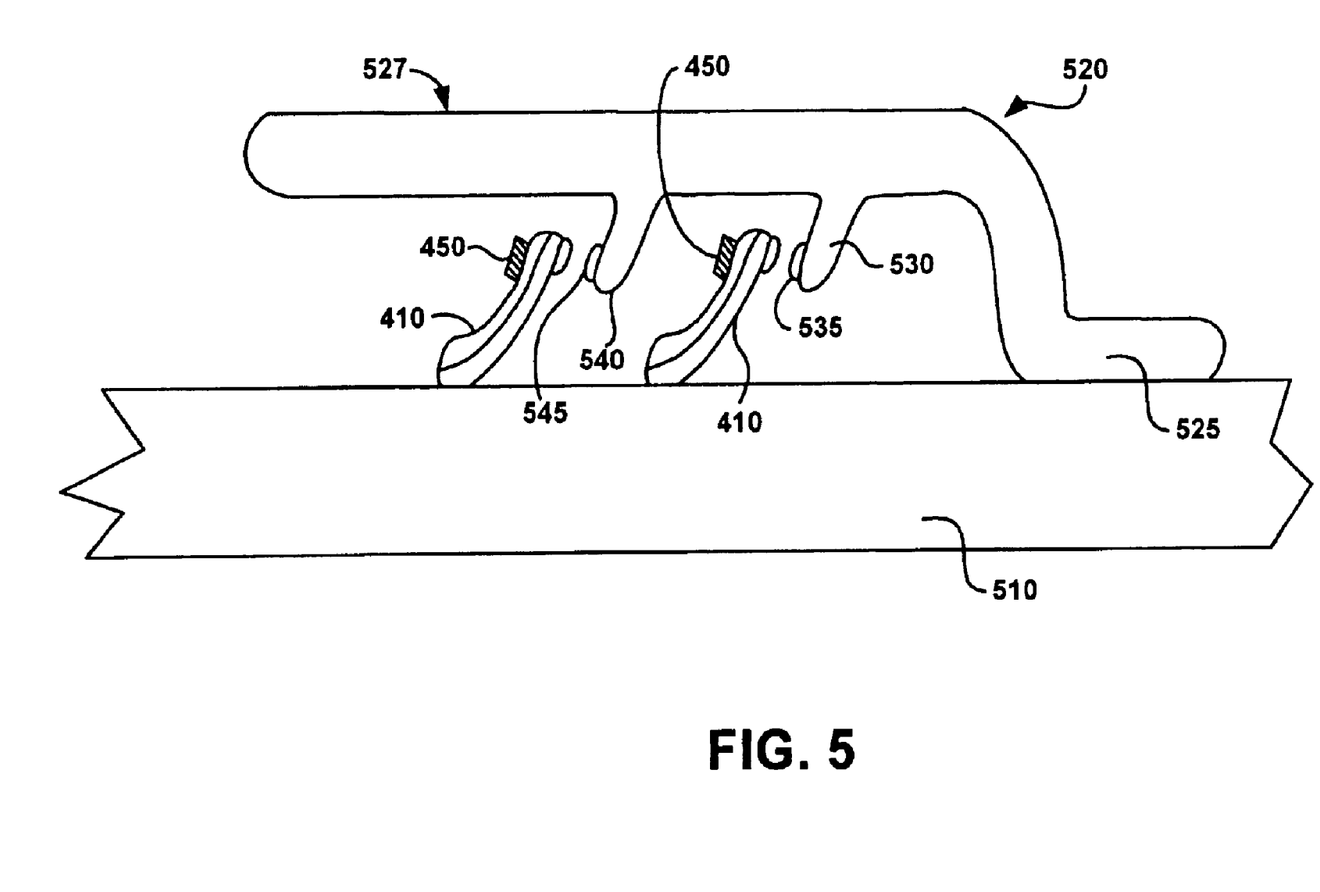
FIG. 5 is a cross section of a cantilevered structure that is tuned with the thermal bimorph actuators of FIGS. 4A and 4B, in accordance with one embodiment of the present invention.

In the present embodiment, FIG. 5 is a diagram illustrating a cross section of a cantilevered structure 520 disposed on a substrate 510, in one embodiment of the present invention. While embodiments of the present invention are described in relation to a cantilevered structure, other embodiments are well suited to various devices and structures supported on a substrate or other suitable platform that are tuned using exothermically reactive structures, e.g., the structures in FIG. 1.

The cantilevered structure 520 is anchored to the substrate 510 at an end 525. In the present embodiment, the resonating arm 527 of the cantilevered structure 520 is capable of mechanical movement at a desired frequency when excited. The cantilevered structure 520 also comprises a plurality of extensions (e.g., extensions 530 and 540) for tuning the cantilevered structure 520. The extensions are suitably shaped for fixing a point of permanent contact between the cantilevered structure and the structure via any suitably shaped actuator. The plurality of extensions are located in varying locations on the cantilevered structure 520. The locations are chosen, such that, fixing the location in relation to the substrate restricts the overall movement of the cantilevered structure 520.

While embodiments of the present invention illustrate the tuning of the cantilevered structure 520 at two locations, other embodiments are well suited to tuning the cantilevered structure 520 at more than two locations, depending on the desired frequency characteristics. Furthermore, the exemplary use of the cantilevered structure 520 is for purposes of illustrating the tuning the cantilevered structure with an actuator that is activated through the use of an exothermically reactive structure. Other embodiments are well suited to tuning any tunable device through the use of an actuator that is activated with the exothermically reactive structure.

Returning back to FIG. 5, a plurality of fixed actuators are associated with each of the plurality of extensions. In one embodiment, the actuators are of some form of the actuators 410 illustrated in FIGS. 4A and 4B. The actuators 410 each comprise a coupling component and an exothermically reactive structure. For example, the extension 540 is associated with a first actuator 410. Also, the extension 530 is associated with a second actuator 410.

When individually activated, the actuators 410 engage with a corresponding mated coupler on a corresponding extension (e.g., extensions 530 and 540) in order to tune the tunable cantilevered structure 520. For instance, the first actuator 410 that is associated with extension 540 will engage with the mated coupler 545 to tune the cantilevered structure 520. The second actuator 410 that is associated with extension 530 will engage with the mated coupler 535 to tune the cantilevered structure 520. The locations are chosen, such that, fixing the location restricts the overall movement of the tunable device, thereby allowing for tuning the device by shortening the tunable portion of the tunable device.

The actuators 410 are individually activated by an energy source (not shown). For example, bending of the first actuator 410 associated with extension 540 occurs when an energy source activates the exothermically reactive structure 450 that is attached to the actuator 410 associated with extension 540. Heating of the exothermically reactive structure 450 by the exothermic alloying reaction between metal layers contained therein bends the actuator 410 towards the extension 540. Similarly, heating of the exothermically reactive structure 450 that is attached to the second actuator 410 associated with extension 530 bends the actuator 410 towards the extension 530. In one embodiment, the energy source is a laser beam for providing localized heating. In another embodiment, the energy source is a current source for providing localized heating.

In one embodiment, bending of the actuators 410 permanently couples the free ends of the actuators 410 to the mated components (e.g., 535 and 545) that are attached to the extensions (e.g., 530 and 540). In this manner, the cantilevered structure 520 is permanently tuned to a desired frequency by shortening its resonating arm 527 to the substrate 510 through an extension and corresponding actuator.

Figure 7:
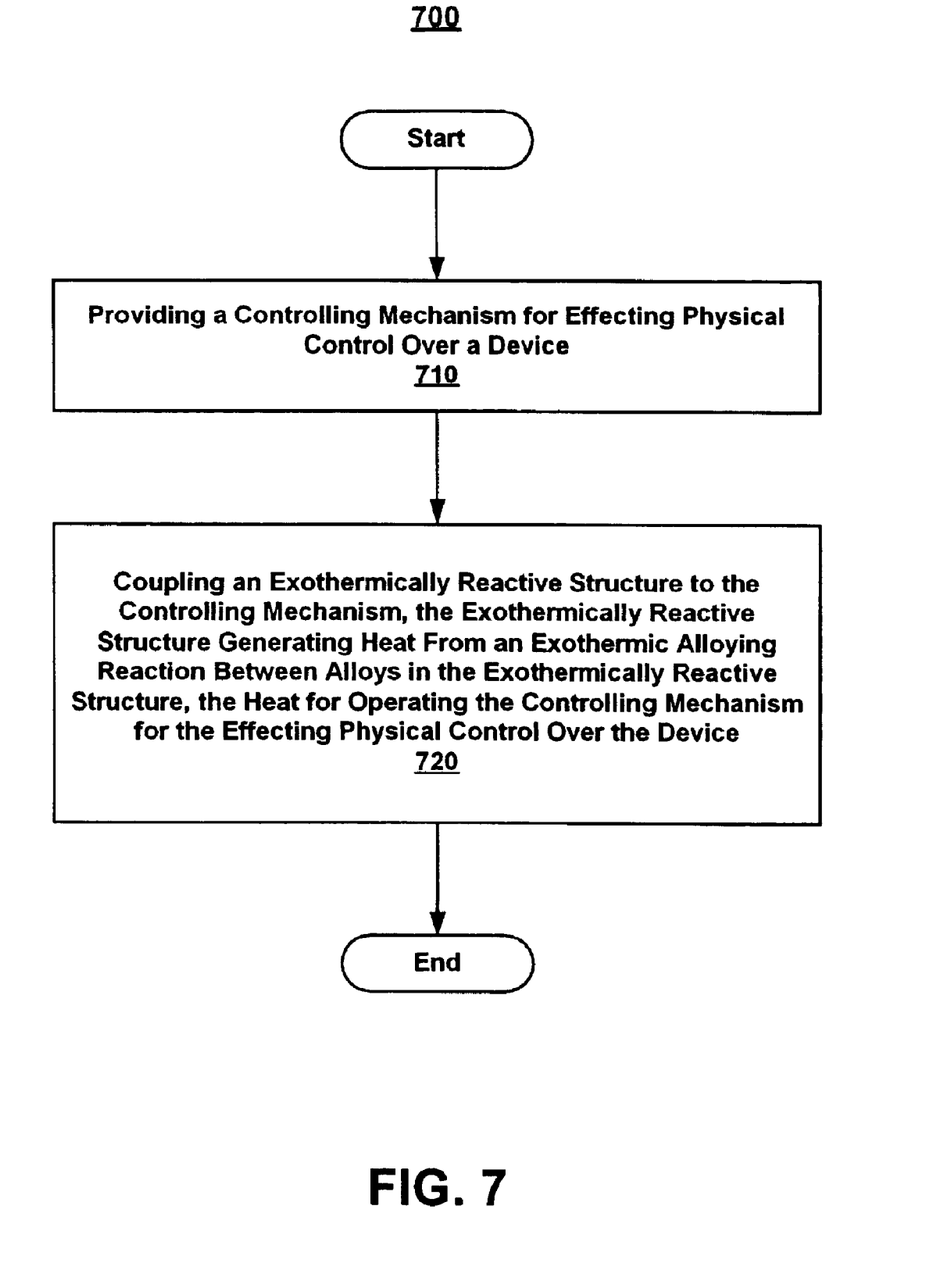
FIG. 7 is a flow chart of a method for controlling movement of a device after packaging, in accordance with one embodiment of the present invention.

FIG. 7 is a flow chart illustrating steps in a method for controlling movement of a device, in accordance with one embodiment of the present invention. In step 710, the present embodiment provides a controlling mechanism for effecting physical control over a device. The device in one embodiment is disposed on a structure. In one embodiment, the device is disposed on a semiconductor substrate. In another embodiment, the device is disposed on a substrate, and enclosed within a sealed enclosure, or packaged environment.

In step 720, the present embodiment couples an exothermically reactive structure on the controlling mechanism. The exothermically reactive structure, when activated, generates heat from an exothermic alloying reaction between alloys in the exothermically reactive structure. In one embodiment, the exothermically reactive structure is a multilayer structure comprising at least two thin foil layers of at least two different alloying metals that when heated results in the exothermic alloying reaction. Heat from the exothermic alloying reaction initiates and produces operation of the controlling mechanism for effecting physical control over the device.

The exothermically reactive structure is be activated after packaging of the device to generate heat from the exothermic alloying reaction, in one embodiment. As described previously, activation occurs by providing energy (e.g., heat) to the exothermically reactive structure from an external energy source. In embodiments, the energy source is a laser for providing localized heating, a current source for providing localized heating, or an oven for providing bulk, or global heating of a sealed enclosure containing the exothermically reactive structure.

Operation of the controlling mechanism occurs by using heat from the activation of the exothermic alloying reaction. In one embodiment, the controlling mechanism releasing the device from the structure. In that case, the controlling mechanism initially secures the device to said structure. Operation of the controlling mechanism comprises melting the localized segment using heat from the exothermic alloying reaction. As such, the device is released from the structure.

In another embodiment, the controlling mechanism permanently fixes a position of the device by coupling the controlling mechanism to the device. In the present embodiment, the controlling mechanism comprises an actuator adapted to fix a first end of the actuator to a substrate. The actuator also comprises a free end capable of a bending motion when the actuator is exposed heat from the exothermic alloying reaction. The bending motion moves the free end into contact with the device.

In another embodiment, the controlling mechanism tunes a resonating frequency of the device by coupling the controlling mechanism to the device. In one embodiment, the device is a resonating device. In the present embodiment, the controlling mechanism comprises an actuator adapted to fix a first end of the actuator to a substrate. The actuator comprises a free end capable of a bending motion when the actuator is exposed to heat from the exothermic alloying reaction. The bending motion moving the free end into contact with the device.

Embodiments of the present invention, an apparatus for releasing and securing a device using an exothermically reactive structure, is thus described. While the present invention has been described in particular embodiments, it should be appreciated that the present invention should not be construed as limited by such embodiments, but rather construed according to the below claims.

What is claimed is:

1. An apparatus for controlling movement of an electronic device comprising:
    a controlling mechanism for effecting physical control over said electronic device that is disposed on a structure; and
    an exothermically reactive structure coupled to said controlling mechanism for operation of said controlling mechanism, said exothermically reactive structure when activated generating heat for said operation from an exothermic alloying reaction between alloys in said exothermically reactive structure, wherein said operation comprises a releasing of said electronic device from said structure.

2. The apparatus of claim 1 further comprising a localized segment of said controlling mechanism, wherein said electronic device is secured to said structure through said localized segment, and wherein said operation comprises a melting of said localized segment from said heat, said operation releasing said electronic device from said structure.

3. The apparatus of claim 2, wherein said controlling mechanism comprises a tether, said tether coupled to said structure and to said electronic device.

4. The apparatus of claim 2, wherein said controlling mechanism comprises:
    a first anchor coupled to a substrate of said structure;
    a second anchor coupled to said substrate;
    an arm member with first and second ends attached to said first and second anchors, respectively, said arm member physically displaced off of said substrate;
    said arm member comprising said localized segment located near said first end of said beam; and
    said exothermically reactive structure disposed on said localized segment for melting said arm member at said localized segment resulting in a free end of said arm member that is capable of movement.

5. The apparatus of claim 1, further comprising:
    an external energy source for activating said exothermic alloying reaction after packaging of said electronic device.

6. The apparatus of claim 1, wherein said structure is a packaged enclosure.

7. An apparatus for controlling movement of an electronic device comprising:
    a controlling mechanism for effecting physical control over said electronic device through contact between said controlling mechanism and said electronic device; and
    an exothermically reactive structure coupled to said controlling mechanism for operation of said controlling mechanism, said exothermically reactive structure when activated generating heat for said operation from an exothermic reaction between alloys in said exothermically reactive structure, wherein said operation comprises a movement of said controlling mechanism.

8. The apparatus of claim 7, wherein said controlling mechanism comprises:
    an actuator adapted to fix a first end of said actuator to a substrate, and comprising a free end capable of a bending motion when said actuator is exposed to said heat, said bending motion moving said free end into said contact with said electronic device; and
    said exothermically reactive structure disposed on said localized segment of said actuator for providing said heat when said exothermically reactive structure is activated.

9. The apparatus of claim 8, wherein said free end is adaptively shaped for coupling to a mated component located on said electronic device upon said contact, thereby restricting movement of said electronic device.

10. The apparatus of claim 8, wherein said bending motion permanently couples said free end to said mated component for positioning said electronic device.

11. The apparatus of claim 8, wherein said electronic device is a resonating device, and said bending motion permanently couples said free end to said mated component for tuning said resonating device.

12. The apparatus of claim 7, further comprising:
    an external energy source for activating said exothermic alloying reaction after packaging of said electronic device.

13. The apparatus of claim 12, wherein said external energy source is a laser beam for activating said exothermic alloying reaction.

14. The apparatus of claim 7, wherein said exothermically reactive structure comprises a multilayer structure comprising at least two thin foil layers of at least two different alloying metals that when heated results in said exothermic alloying reaction.

15. A method for controlling movement of electronic devices comprising:
    providing a controlling mechanism for effecting physical control over an electronic device, said electronic device disposed on a structure; and
    coupling an exothermically reactive structure to said controlling mechanism, said exothermically reactive structure when activated generating heat from an exothermic alloying reaction between alloys in said exothermically reactive structure, said heat for operating said controlling mechanism for said effecting physical control over said electronic device; and
    releasing said electronic device from said structure, wherein said providing said controlling mechanism comprises initially securing said electronic device to said structure, and wherein said operating said controlling mechanism comprises melting a localized segment of said controlling mechanism from said heat for said releasing.

16. The method of claim 15, further comprising:
    permanently positioning said electronic device by coupling said controlling mechanism to said electronic device, and wherein said controlling mechanism comprises:
    an actuator adapted to fix a first end of said actuator to said structure, and comprising a free end capable of a bending motion when said actuator is exposed to said heat in a localized segment, said bending motion moving, said free end into contact with said electronic device.

17. The method of claim 15, further comprising:

tuning a mechanical response of said electronic device by coupling said controlling mechanism to said electronic device, and wherein said controlling mechanism comprises:

an actuator adapted to fix a first end of said actuator to said structure, and said actuator comprising a free end capable of a bending motion when said actuator is exposed to said heat in a localized segment, said bending motion moving said free end into contact with said electronic device.

18. The method of claim 15, further comprising:

providing an external energy source for activating said exothermic alloying reaction after packaging of said electronic device.

19. The method of claim 15, wherein said exothermically reactive structure comprises a multilayer structure comprising at least two thin foil layers of at least two different alloying metals that when heated results in said exothermic alloying reaction.

* * * * *